Figure 1:
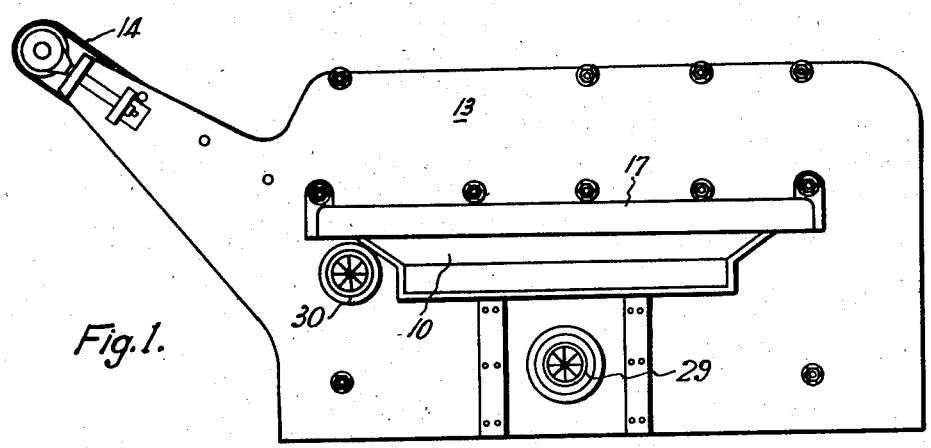

April 28, 1959     H. A. WILKINSON     2,884,232
BATCH MIXER

Filed March 31, 1958

INVENTOR
HORACE A. WILKINSON

April 28, 1959     H. A. WILKINSON     2,884,232
BATCH MIXER
Filed March 31, 1958
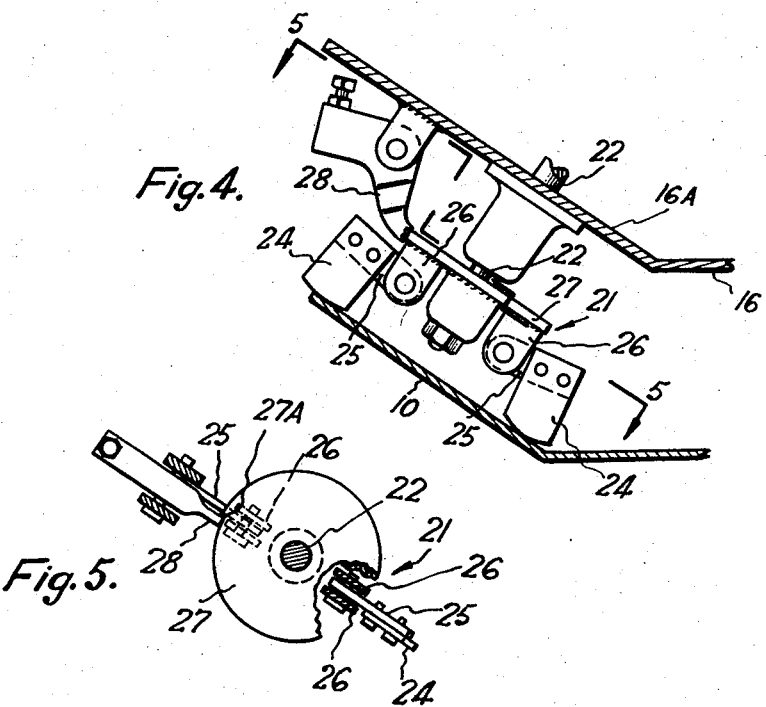
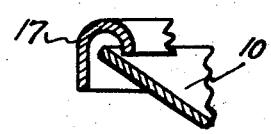
INVENTOR
HORACE A. WILKINSON

United States Patent Office 2,884,232
Patented Apr. 28, 1959

2,884,232

BATCH MIXER

Horace Allan Wilkinson, Lilli Pilli, near Sydney, New South Wales, Australia, assignor, by mesne assignments, to Concrete Industries Engineering Development Pty. Limited, Villawood, New South Wales, Australia, a New South Wales company Application March 31, 1958, Serial No. 725,041

5 Claims. (Cl. 259—32)

In the manufacture of, for example, cement tiles by a continuous process, it has been customary to mix the requisite cement in an elevated pan-type mixer provided with conventional stirrers, agitators, ploughs and the like, the pan having a side or bottom door through which a mixed batch of cement may be discharged, while the pan (if rotary) is stationary, by gravity onto a conveyor leading to the moulding or extruding station of the plant. The mentioned pan may be fixed, in which case the stirrers and the like are required to perform a planetary movement inside the pan or, conversely, the pan may be rotated in relation to rotary stirrers and the like of fixed location.

However, whatever the arrangement may be, it is inconvenient and time-consuming manually to discharge the cement from an elevated pan and it is the object of the present invention ot provide a non-elevated, doorless batch mixing pan and discharge arrangement therefor, all of which may readily be observed and attended by an operative standing on the floor on which the entire tile production unit is mounted.

Therefore, according to the present invention, a batch mixer for mixing batches of cement, concrete, foundry sand or the like comprises a flat-bottomed circular pan, with an outwardly inclined wall, mounted for rotation about a vertical axis upstanding from a floor on which the mixer is seated, the pan being provided with conventional rotating stirrers together with any requisite incidental ploughs, scrapers, or the like, and discharge of mixed cement from the pan being effected by means of a rotary impeller disc disposed for rotation on an axis normal to the inclined wall of said pan and adapted to lift cement from the pan and throw it over the wall thereof onto the lower end of an upwardly inclined continuous belt conveyor adapted to feed the discharged batch of mixed cement or other material to a utilization point such as the extrusion station of a cement tile producing unit.

The impeller described above may comprise a flat rotary disc having radially disposed impeller blades extending therefrom and facing towards the inner wall of the pan and the impeller may conveniently be driven by means of a shaft extending through said wall and adapted to be clutched to a prime mover outside the pan; the arrangement being such that, with the pan in motion and the impeller shaft declutched from said prime mover, the impeller will rotate with the pan and will be free for independent rotation about its own axis under the urge of the relative motion of cement mix within the pan.

Discharge of a mixed batch from the pan aforesaid can also be effected expeditiously if rotation of the pan is continued during the discharge operation and the present invention also contemplates an arrangement wherein the said impeller is mounted independently of the pan so that discharge from the latter of a mixed batch can be effected without halting rotation thereof.

Therefore, further according to the present invention, the discharge impeller shaft may be rotatably mounted to extend angularly from a bridge member extending diametrically across the mouth of the pan with the axis of rotation of said impeller shaft again normal to the inclined wall of said pan. The free end of said impeller shaft is disposed interiorly of the pan and is terminally fitted with a blade-mounting disc having pivotally mounted thereon a series of angularly spaced radially disposed arms, each having secured thereto a downwardly inclined material discharge blade having its free lower end contoured to a mean curvature dictated by wiping action of such end of the blade when rotating in contact with the inner face of the inclined wall of the pan aforesaid.

Consequent upon the construction just described, the batch discharging blades will, by gravity, maintain wiping contact with the inner face aforesaid of the pan wall irrespective of wear occasioned by such wiping action and, in operation, the described impeller blades will operate to throw a batch mix over the side of the pan onto the lower end of an endless belt conveyor as described above.

The abovementioned blade-mounting disc is preferably peripherally contoured as a cam comprising a single turn spiral of which the opposite ends are joined by a radially disposed step adapted to be engaged by the free end of a dog pivotally carried by the fixed bridge aforesaid so that, when no drive is imparted to the impeller shaft, the blades aforesaid are held stationary by said dog to operate as pan side wall scrapers during the batch mixing operation. It is to be understood, however, that when drive is imparted to the impeller shaft, during batch emptying, the dog aforesaid will ride freely on the periphery of said blade-mounting disc.

The above mentioned diametrical bridge, in a preferred construction, extends diametrically beyond opposite sides of the rotary pan to be supported from a base frame on which the rotary pan is mounted, and such bridge is preferably of box formation so that it may house driving gear for the impeller described above and also for a cluster of paddles or stirrers arranged in circular array below said bridge and in which low- or high-speed paddles or stirrers are alternated.

One end of the bridge as described above may also conveniently house an electrical control panel whereby a predetermined time cycle can be established according to the nature of material being mixed in the pan. For example, the control panel may be organised to set the pan in motion and also a pair of low-speed paddles in said cluster while the mix ingredients are being supplied to the pan and, after a predetermined period of mixing with the aid of slow paddles, the alternated high-speed paddles would be set in motion for a predetermined period. On termination of that period, the conveyor belt would be set in motion simultaneously with starting of the impeller to feed mixed material from the pan to said conveyor.

As a safeguard to operatives using the machine described above, the upper periphery of the pan may rotate within fixed U-section guard rails of arcuate formation extending above the pan edge from opposite sides of the bridge.

Location of the pan near floor level as above stated also facilitates introduction to the pan of ingredients for mixing and further enables an attendant readily to observe what is going on in the pan.

Figure 2:
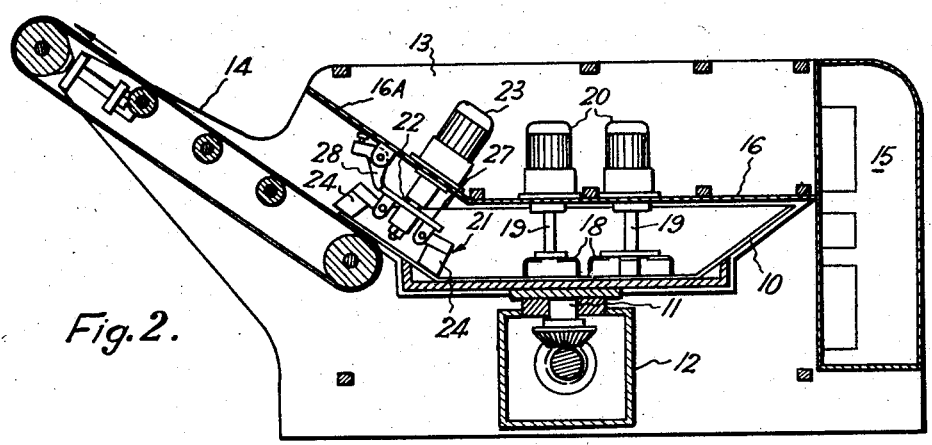
Figure 3:
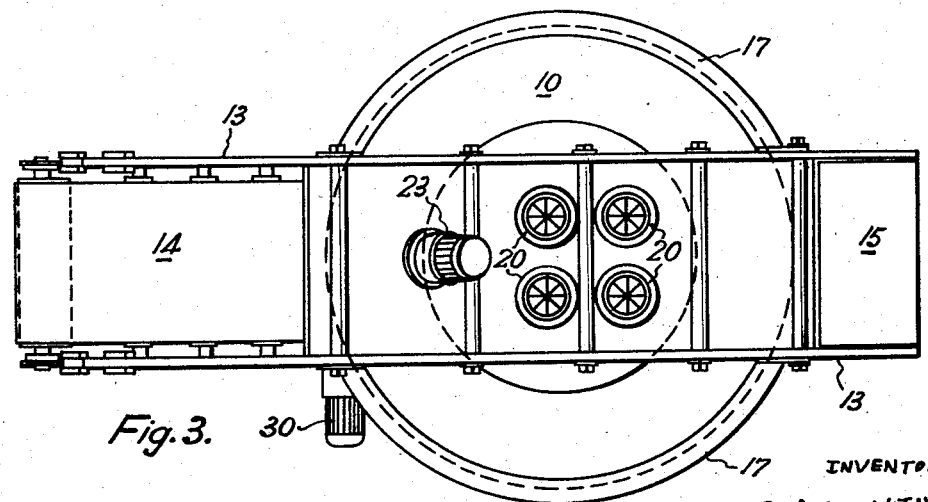

A preferred embodiment of the invention will now be described by way of example, reference being made to the accompanying drawings wherein:

Fig. 1 is a side elevation of that embodiment;
Fig. 2 is an equivalent sectional view of Fig. 1;
Fig. 3 is a plan view of Fig. 1;
Fig. 4 is an enlarged elevational detail of a discharge impeller;
Fig. 5 is a section on line 5—5 of Fig. 4; and
Fig. 6 is an enlarged sectional view of a detail of construction.

In its illustrated form, a cement batch mixer according to the present invention comprises an inclined-wall pan 10 mounted for rotation on a vertical shaft 11 driven by any suitable means. Shaft 11 is rotatably mounted (inter alia) by means of a box housing 12 extending between spaced side walls 13 essentially comprising a main frame for the machine, said side walls extending above the pan and beyond diametrically opposite portions of the latter.

An upwardly inclined endless belt conveyor 14 is operatively mounted between the side plates 13 at one side of pan 10 while a control box 15 may conveniently be disposed between the opposite ends of said plates. A transversely disposed plate 16 having an upwardly inclined end 16A extends between side plates 13 above pan 10 to complete the frame structure and to constitute a mounting base for stirrers or the like and a discharge impeller about to be described, the upper portion of the frame structure detailed above in effect constituting a bridge which extends diametrically across the open mouth of said pan. The exposed upper edge of pan 10, which is not within the confines of the frame structure described above, rotates within arcuate guard rails 17 of inverted U-section having their ends secured to the respective frame plates 13.

For the purpose of mixing batch material (e.g. sand-cement-water) introduced into pan 10 by any convenient means, there is provided a cluster of stirrers 18 comprising diametrically opposite high-speed paddles alternating with diametrically opposite low-speed paddles, only one of each of which is illustrated in Fig. 2, the respective paddles being carried by shafts 19 powered by independent motors 20 mounted on plate 16. A discharge impeller 21 for lifting mixed batch material from pan 10 onto conveyor 14 is fitted to shaft 22 extending from drive motor 23 mounted in the upwardly inclined end 16A of plate 16, the axis of shaft 22 being normal to the inclined wall of pan 10.

In its illustrated form, impeller 21 embodies a pair of diametrically opposed blades 24 each carried by an arm 25 pivotally mounted between a pair of lugs 26 extending downwardly from a blade-mounting disc 27 mounted on motor shaft 22. The free end of each blade 24 is contoured to a mean curvature dictated by wiping action of the blade when moving in contact with the inclined wall of pan 10. Disc 27 is peripherally contoured as a cam comprising a single-turn spiral having its adjacent ends joined by a radially disposed step 27A adapted for engagement with the nose of a pivoted dog 28 mounted on plate 16A so that, when shaft 22 is not power driven by motor 23, the blades 24 are held stationary by engagement between step 27A and dog 28 whereby blades 24 operate as pan wall scrapers during the mixing of a batch in pan 10.

As indicated by the introduction hereto, one end of the bridge frame structure (earlier referred to as control box 15) may conveniently house an electrical control panel (not illustrated) so that, for example, a predetermined control cycle may be established whereby the pan is set in motion simultaneously with actuation of a pair of low-speed paddles 18 while batch ingredients are being supplied to the pan 10 and, after a predetermined period of low speed paddle mixing, the high speed paddles 18 would be set in motion for a further predetermined period to complete the mixing. On termination of the last mentioned period, the belt conveyor 14 would be put in motion simultaneously with powering of the impeller 21 to lift batch material from the still rotating pan onto conveyor 14.

References 29 and 30 respectively indicate pan and conveyor belt powering motors.

I claim:

1. A floor level batch mixer comprising a flat-bottomed pan having an outwardly inclined wall and mounted for rotation about a vertical axis, batch mixing stirrers or the like mounted for rotation within said pan, an upwardly inclined endless conveyor having its lower end disposed adjacent the upper edge of said pan, and a rotary impeller mounted within said pan adapted to transfer mixed batch material from said pan onto said endless conveyor.

2. A batch mixer according to claim 1 characterised in that said rotary impeller is mounted on a rotary shaft having its axis of rotation disposed normal to the inclined wall of said pan.

3. A floor level batch mixer comprising a flat-bottomed circular pan having an outwardly inclined wall and mounted for rotation about a vertical axis, batch mixing stirrers of the like mounted for rotation within said pan, an upwardly inclined endless conveyor having its lower end disposed adjacent the upper edge of said pan, and a rotary impeller mounted within said pan, the shafts of said stirrers and impeller extending downwardly into said pan from a bridge member extending across the open mouth of said pan.

4. A batch mixer according to claim 3 characterised in that the axis of rotation of the rotary impeller shaft is disposed normal to the inclined wall of said pan.

5. A batch mixer according to claim 4 wherein said rotary impeller comprises a plurality of blades, each of said blades carried by a radially disposed arm pivotally mounted on a disc secured to the shaft of said impeller, said disc being of single-turn spiral contour of which the adjacent ends are joined by a radially disposed step adapted to co-act with a dog pivotally carried by said bridge.

References Cited in the file of this patent
UNITED STATES PATENTS

| 747,154 | Durand | Dec. 15, 1903 |
| 934,961 | Dufour | Sept. 21, 1904 |